United States Patent [19]
Berg

[11] 3,977,116
[45] Aug. 31, 1976

[54] SINKER FOR BAIT CASTING AND FLY-FISHING
[76] Inventor: Ragnvy Berg, 3 Parkgatan, Alvsbyn, Sweden, 94200
[22] Filed: July 21, 1975
[21] Appl. No.: 597,778

[52] U.S. Cl. .............................................. 43/43.12
[51] Int. Cl.² ...................................... A01K 95/00
[58] Field of Search ................................. 43/43.12

[56] References Cited
UNITED STATES PATENTS

| | | | |
|---|---|---|---|
| 2,181,317 | 11/1939 | Fernstrom | 43/43.12 X |
| 2,830,400 | 4/1958 | Perry | 43/43.12 |
| 3,026,646 | 3/1962 | Weaver | 43/43.12 |
| 3,462,870 | 8/1969 | Terilli | 43/43.12 X |

Primary Examiner—Louis G. Mancene
Assistant Examiner—Daniel J. Leach
Attorney, Agent, or Firm—Pierce, Scheffler & Parker

[57] ABSTRACT

A sinker structure for use in bait casting and fly fishing which is initially connected to the hook member but which includes a pivoted arm arrangement for disconnecting the sinker from the hook as soon as a pull is exerted on the line after the sinker has been allowed to sink into the water.

3 Claims, 3 Drawing Figures

SINKER FOR BAIT CASTING AND FLY-FISHING

The present invention relates to a sinker for fish baits and preferably for light-weight baits as used, for example, for bait casting and fly-fishing.

When using light-weight fish baits, it is often difficult to cast the bait a sufficient distance. Due to air resistance and wind blasts, the direction of the cast is incalculable and, therefore, the cast length and fishing luck are not as desired. It has been tried to overcome this drawback by using special fishing rods, fly cast rods, which however are very expensive and not always have the desired effect. Also special sinkers have been constructed previously. One such known sinker comprises a support attached to the line and a special weight attached to said support. The support consists of two resiliently interconnected parts, on which the weight is suspended. Upon a pull on the line the two parts are somewhat separated and the weight is released. The support, however, remains in its position and produces a disturbing effect, which in certain cases renders commercial fishing entirely impossible. This disadvantage is entirely eliminated in the sinker according to the present invention which upon a pull on the line is completely released from the bait hook. The baits being used may be as light-weight as desired, and of the sinker nothing which disturbs the fishability of the spoon-bait, spinner or fly. Fly cast rods are practically unnecessary, and fly-fishing can advantageously take place from land with a casting rod. The sinker, furthermore, is of simple design with low manufacturing costs. The sinker according to the present invention has the characterizing features as defined in the attached claims.

Figure 1:
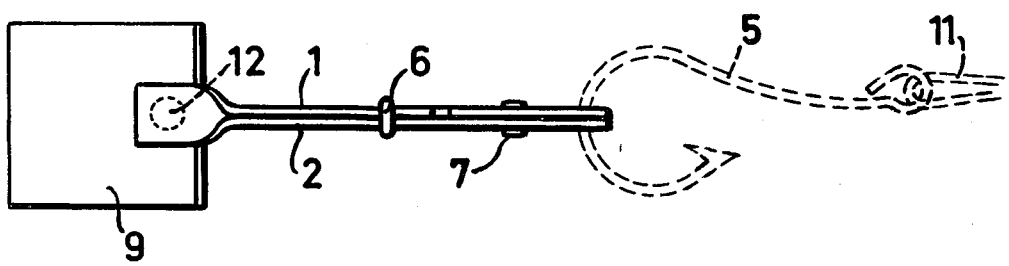
Figure 2:
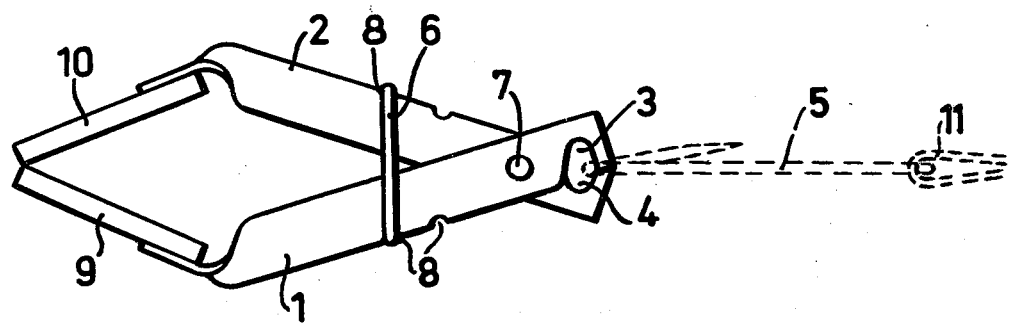
Figure 3:
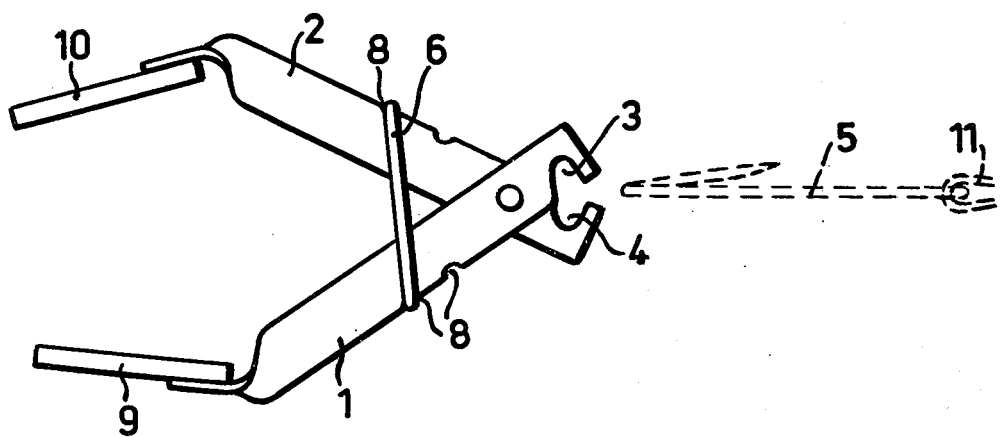

An advantageous embodiment of the invention is described in greater detail in the following, with reference to the accompanying drawing, in which FIG. 1 is a top plan view of the sinker seen against the edges of the legs and against one of the plate-shaped pieces and a bait hook attached between the legs, and FIGS. 2 and 3 show the same device seen against the plane sides of the legs, which with one end abut and, respectively, separate from each other.

A sinker according to the embodiment shown consists of two legs 1, 2, which are pivotally connected with each other by means of, for example, a rivet 7. At one end of each leg 1, 2 recesses 3, 4 are provided, in which a bait-hook 5 is retained when the ends abut each other. This is effected, for example, by means of a rubber band 6 about the legs, which is laid in recesses 8 in the outwardly directed edges of said legs. The other ends of said legs are bent inward toward a symmetry line therebetween. At these ends plate-shaped pieces 9, 10 are fastened.

The sinker to be used is hooked onto the outermost bait and during the cast held closed by the rubber band and by the air pressure, which during the cast acts upon the outer surfaces of the plate-shaped pieces. When the sinker has sunk into the water, a slight pull is made on the line 11. Owing to pressure forces from the water stream then running in parallel with the symmetry line and acting on the inner surfaces of the plate-shaped pieces, these pieces and the legs are pressed outward whereby the legs are separated and release the bait.

The sinker preferably is made of steel sheet metal. The two legs are pivotally connected by a rivet 7, and the plate-shaped pieces are fastened at the inwardly bent leg ends by spot welding at 12.

What I claim is:

1. A sinker for fish baits and preferably such which, for example, are used for bait casting and fly-fishing, which sinker comprises two legs pivotally connected to each other, which legs at one end abut each other and are provided with recesses for retaining a bait-hook, the other ends of said legs being bent inwards toward a symmetry line between the legs and adapted to be spaced apart or moved together by the action of pressure forces from a stream flowing substantially in parallel with the symmetry line, said spacing apart taking place against the action of a resilient member attached between the legs.

2. A sinker according to claim 1, characterized in that said other ends of the legs plate-shaped pieces are attached, against which the pressure forces are arranged to preferably act.

3. A sinker according to claim 1, characterized in that the resilient member is an annular rubber band attached about the legs in recesses in the outwardly directed edges of the legs.

* * * * *